United States Patent [19]
Ainbinder et al.

[11] 3,990,263
[45] Nov. 9, 1976

[54] ABSORPTION REFRIGERATING INSTALLATION

[76] Inventors: Emmanuil Gershkovich Ainbinder, bulvar pushnika, 7, kv. 8; Georgy Vasilievich Kurilov, ulitsa Universitetskaya, 97, kv. 21; Leonid Sergeevich Neustroev, ulitsa Artema, 127, kv. 42, all of Donetsk, U.S.S.R.

[22] Filed: Dec. 17, 1974

[21] Appl. No.: 533,496

Related U.S. Application Data

[63] Continuation of Ser. No. 452,399, March 18, 1974, abandoned, which is a continuation of Ser. No. 359,841, May 14, 1973, abandoned, which is a continuation of Ser. No. 242,718, April 10, 1972, abandoned.

[52] U.S. Cl. .................................... 62/476; 62/485
[51] Int. Cl.² ........................................ F25B 15/06
[58] Field of Search ............... 62/476, 484, 485, 489

[56] References Cited
UNITED STATES PATENTS

| | | | |
|---|---|---|---|
| 3,299,667 | 1/1967 | Aronson | 62/476 |
| 3,440,832 | 4/1969 | Aronson | 62/485 X |
| 3,491,545 | 1/1970 | Leonard, Jr. | 62/476 X |
| 3,561,227 | 2/1971 | Swearingen | 62/489 X |

*Primary Examiner*—William E. Wayner
*Attorney, Agent, or Firm*—Holman & Stern

[57] ABSTRACT

In an absorbtion refrigerating installation each evaporator-absorber unit has a group of vertical pipes secured at their ends in pipe sheets. Provided in the upper portion of the units is an outlet for the liquid to flow down outside the pipes. Both, in the passages of the pipes and between the pipes the units are divided by hydraulic locks into spaces of different pressures. The hydraulic locks may be fashioned as spiral springs having a sponge stopper disposed thereon. The secondary evaporator of the installation is united in a group of the pipes with the main (primary) absorber so that the absorbent of the main absorber flows down from the outlets and the outer surface of the pipes is essentially the surface of the absorber, whereas the inner surface along which the refrigerant flows down is the surface of the secondary evaporator.

5 Claims, 4 Drawing Figures

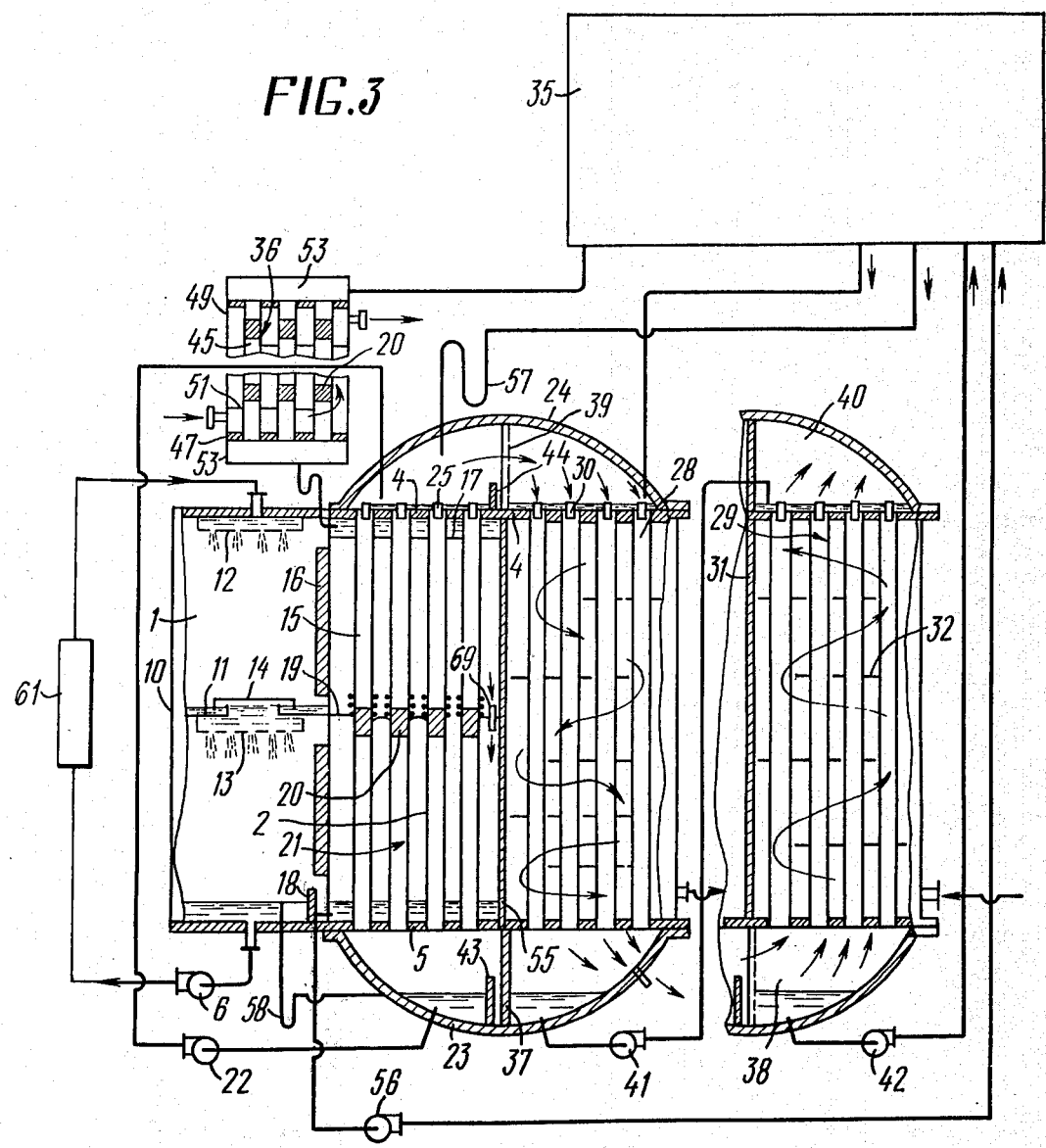

ABSORPTION REFRIGERATING INSTALLATION

This is a continuation of application Ser. No. 452,399, filed Mar. 18, 1974 which in turn is a Rule 60 Continuation Application of Ser. No. 359,841, filed May 14, 1973, which in turn is a Rule 60 Continuation of USSN 242,718, filed Apr. 10, 1972, all now abandoned.

BACKGROUND OF THE INVENTION

The present invention relates to installations used for producing artificial cold and more particularly, it relates to absorption lithium bromide refrigerating installations in which high-temperature heat carriers are used as a hot source.

It is known that absorption lithium bromide refrigerating installations operate so that the heat of condensation and absorption is removed with the aid of cooling circulating water. When constructing and using large refrigerating stations the provision thereof with circulating or running cooling water requires considerably high capital and operational investments, and therefore, the problem of the reduction of the amount of the cooling water consumed by absorption lithium bromide installations is rather pressing.

At present, attempts are made to decrease the amount of the circulating water consumed by absorption lithium bromide installations by decreasing the thermal load of the condenser by way of, for example, using a double-stage regeneration and raising the total temperature level of the heat removal by way of, for example, employing cascade systems.

Conventional cascade installations employing high- and low-pressure absorbers and high- and low-pressure evaporators coupled with the latter make it possible to remove the heat of absorption from the installation at a temperature level that is much higher than that in hitherto used installations employing one absorber.

However, in such installations the temperature of the heat removed from the installation is determined in the high-pressure absorber by the temperature of the absorbent at the end of the absorption process in the low-pressure absorber, since it determines the possible limit for the saturation temperature of the vapor formed in the high-pressure evaporator.

With all the other conditions being the same, the temperature of the solution of the absorbent in the low-pressure absorber depends on the temperature of the cold being produced. In view of this the disadvantage of conventional cascade systems is especially important when providing absorption installations for producing cold of zero or negative temperatures, in which the solution of LiBr is to be used as an absorbent.

In installations of a great efficiency it is expedient to cool down the refrigerant by 10°-15° C (for instance, in the case of a group of consumers of artificial cold of initial temperatures differing by 5–7° C).

In this case employment of conventional cascade systems results in considerable losses in the power value of the heat removed from the installation, which is due to a relatively low average temperature level in the high-pressure absorber. At the same time, use of the heat for hot-water supply purposes, or an increase in its temperature level in case the heat is removed directly into air, provides for evident economic advantages.

SUMMARY OF THE INVENTION

The main object of the present invention is to improve from the thermodynamic point of view the operation of the evaporator-high-pressure absorber unit and the evaporator-low-pressure absorber unit, and to raise the temperature level of the heat removed from the high-pressure absorber up to the values determined not by the lowest but highest temperature of the absorbent solution in the low-pressure absorber. It is an object of the present invention to eliminate the afore-mentioned disadvantages.

This task is (these and other objects of the present invention are) accomplished by provision of an absorption refrigerating installation comprising a main evaporator of the refrigerant delivered from the consumer of cold, a main absorber of the vapor of a refrigerant by a liquid absorbent, connected with the main evaporator into a single unit, a secondary evaporator of the refrigerant cooling the main absorber, a secondary absorber of the vapor of the refrigerant delivered from the secondary evaporator, connected with the latter into a single unit, and a regenerator of the liquid absorbent; the installation, according to the invention, being characterized by the fact that each evaporator-absorber unit is essentially a group of vertical passages having outlets disposed at the level thereof and used for directing the liquid along the outer walls of the passages, the secondary evaporator being united in a group of passages with the main absorber in such a manner that the absorbent flowing down the outlets is essentially the absorbent of the main absorber and, consequently, the outer surface of the walls of the passages is the surface of the main absorber, whereas the refrigerant flows down the inner surface of the passages that in this case are the secondary evaporator.

In accordance with a variant of the embodiment of the present invention, the vertical passages disposed transversely relative to the liquid flow may be divided by hydraulic locks disposed either inside each passage, or in the space between their outer walls to divide in this way the space of the evaporators and absorbers into spaces of different pressures.

In accordance with another variant of the embodiment of the present invention, each evaporator-absorber unit may be made as a bunch of vertical pipes secured at the top and at the bottom by pipe sheets, said outlets being fashioned as a horizontal partition having holes disposed around the pipes and positioned under the upper pipe sheet.

In accordance with still another embodiment of the present invention, the installation may be provided with hydraulic locks positioned in the inter-pipe space, formed by a partition with holes for the pipes, in which each hole has spiral springs inserted therein and embracing the pipes, the hydraulic locks inside the pipes being made from springs carrying a stopper made from a porous material.

The installation may comprise water coolers of the absorbent, mounted between the regenerator and the secondary absorber, as well as between the main and secondary absorbers.

Lastly, the heat-transferring surfaces of the secondary absorber and water coolers may be provided with an outer corrugation used for their air cooling.

BRIEF DESCRIPTION OF THE DRAWINGS

The following detailed description of a exemplary embodiment of the present invention is given with reference to the accompanying drawings, in which:

FIG. 3 shows a schematic view of the variant of the installation with an open evaporator;

DETAILED DESCRIPTION OF THE PREFERRED EMBODIMENT

Figure 1:
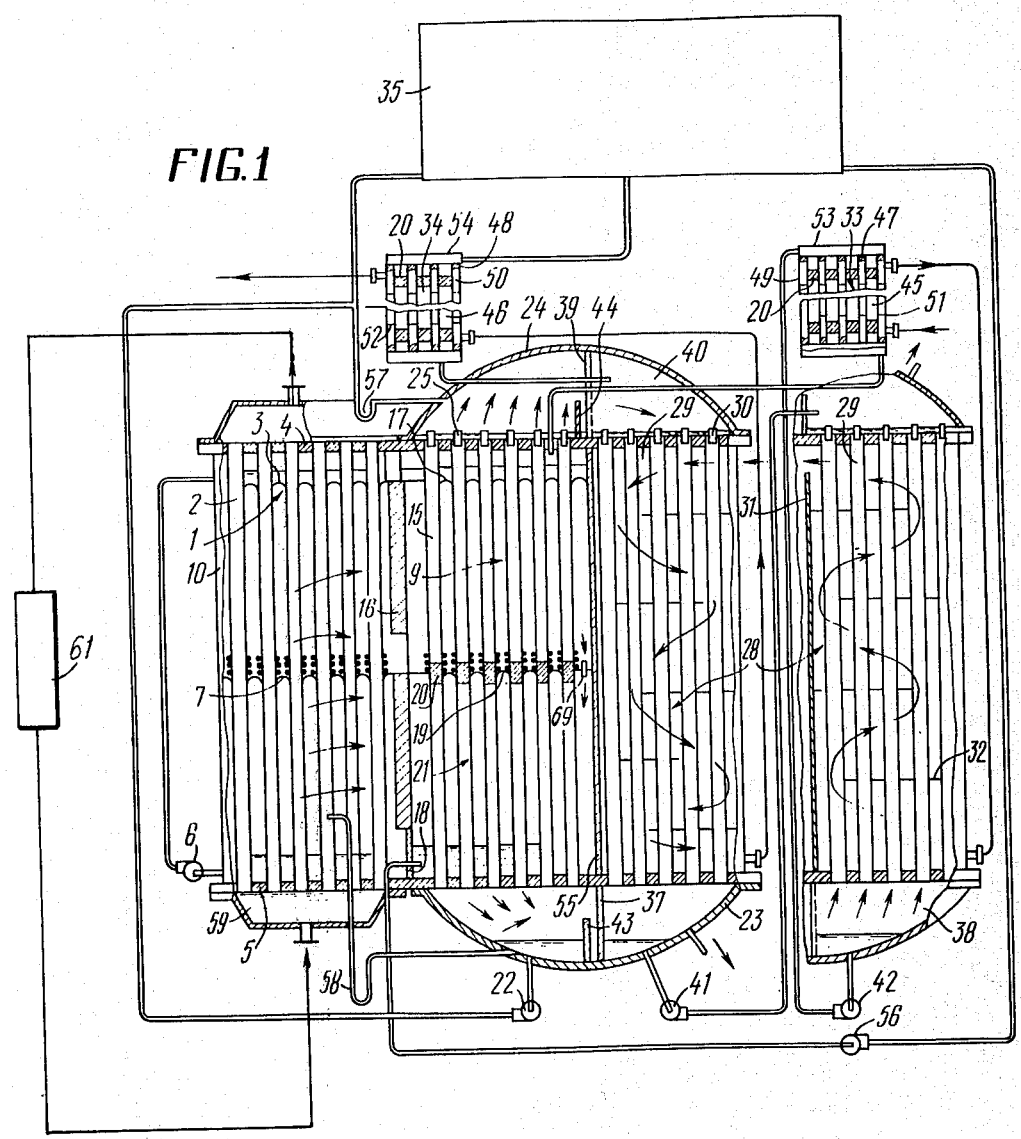
FIG. 1 shows a schematic view of an absorption refrigerating installation, according to the present invention.

Heated circulating water delivered from the consumer of cold 61 is cooled down in a main evaporator 1 (FIG. 1). The main evaporator 1 is essentially a vertical apparatus in which circulating water is supplied into pipes 2 and recirculated water is supplied to the outer surface of the pipes 2. The circulating water is cooled down in it due to a partial evaporation of the water supplied onto the pipes 2. The water is distributed among the pipes 2 with the aid of pipe sheet 3 having holes which are drilled together with main pipe sheets 4, 5. The holes of the false pipe sheet 3 have a the conical shape in order to drain water (see FIG. 2) along the surface of the pipe 2 only. The inlet portion of the pipe 2 has a transverse knurling or grooves providing for a uniform wettening of the perimeter of the pipe, whereas the rest of the pipe is provided with a diagonal or other knurling or transverse grooves used for turbulization of the water film. During the operation of the installation the water flows along the pipes into the lower portion of the apparatus, from which it is delivered by a pump 6 back into the space between the main 4 (5) and false pipe sheets 3. The pipe sheets 5 are common for the pipes of all the other apparatus of the installation.

Figure 2:
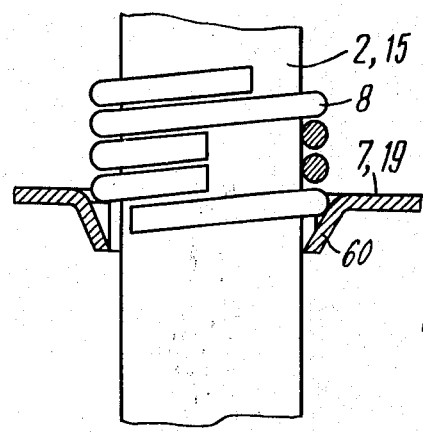
FIG. 2 shows a unit at which a pipe is passed through a false pipe sheet in the installation according to FIG. 1.

The vapor space of the main evaporator 1 is divided by a false pipe sheet 7 into a stage of high pressure and a stage of low pressure (see FIG. 2). Inserted into the holes of the false pipe sheet 7 are spiral springs 8 which are fitted onto the pipes 2 with a small tensioning prior to being installed in place. Provided in the holes of the false pipe sheet 7 is a hollow 60 used to prevent the end turn of the spring 8 from contacting the surface of the false pipe sheet 7. The disposition of the stages of low and high pressures is determined by the direction of feeding of the cooled water.

When using the installation for cooling hermetically sealed objects, i.e., when the atmospheric air or other gases are precluded from getting into the main evaporator together with the cooled water, the above-described evaporator of the closed type may be substituted with an open-type main evaporator in which the cooled circulating water is supplied through a sprinkling plant directly into a drum communicating with the vapor space of a low-pressure main absorber 9. In both cases the evaporator 1 directly adjoins the main absorber 9 via the vapor sapce. and has a cowling 10 common with the main absorber 9.

The main evaporator 1 shown in FIG. 3 is a vertical hollow apparatus provided with bottoms which are essentially a continuation of the pipe sheets 5, the cowling 10, a horizontal partition 11, spraying devices 12 and 13 and a hydraulic lock 14 disposed above the spraying device 13.

The hydraulic lock 14 divides the vapor space of the main evaporator 1 into stages of high and low pressures.

The vapor formed during evaporation of the recirculated water in the main evaporator 1 is delivered into the absorber 9. The main absorber 9 is a vertical case-and-pipe apparatus in which the absorbent solution is supplied onto the outer surface of the pipes 15. The vapor flow is directed into the main absorber 9 from the main evaporator 1 through a louver separator 16. The solution is distributed along the surface of the pipes 15 with the aid of the device shown in FIG. 3. From the space between the main 4 and false pipe sheets 17, the solution is drained via the holes of the false pipe sheet 17 onto the surface of the pipes 15 having transverse (on the inlet portion) and diagonal knurlings. After washing the outer surface of the pipes 15, the solution is drained into the lower portion of the apparatus. The solution contained in the main absorber 9 and the water contained in the evaporator 1 are separated by a partition 18.

The vapor space of the absorber 9 is divided by a false pipe sheet 19 whose holes have the springs 8 for the stages of high and low pressures (see FIGS. 1, 2), inserted therein and fitted onto the pipes 15.

Just like in the evaporator 1, see FIG. 1, in the absorber 9 the separation of the steam space into stages of high and low pressures is provided due to the resistance arising when the liquid and vapor flow through sunk holes formed by the springs 8 of a false pipe sheet 19 and the pipes 15.

The heat liberated as a result of the absorption of cold vapor delivered from the evaporator 1 is removed with the aid of water sprinkling the inner surface of the pipes 15 which together with a divider 20 of the vapor space, inserted in each of said pipes (see FIG. 4), forms a double-stage high-pressure secondary evaporator 21. Water is circulated in the evaporator secondary evaporator 21 with the aid of a pump 22 intaking water from the collector provided in a lower cover 23 of the secondary evaporator 21 and supplying it onto the upper pipe sheet closed with a cover 24. Inserted into the pipes 15 of the secondary evaporator 21 in the upper portion thereof are heads 25 ensuring distribution of the liquid along the inner surface of the pipes.

Figure 4:
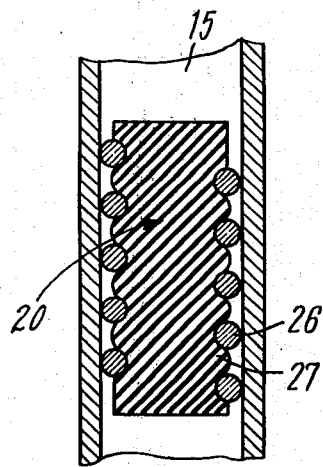
FIG. 4 shows the way in which the pipes of an evaporator are divided into portions of different pressures in the installations shown in FIGS. 1 and 2.

The above-mentioned dividers 20 divide the vapor space of the evaporator into two parts. Maintained in the upper portion of the pipes of the secondary evaporator 21, whose outer surface is sprinkled with a hotter solution, is high pressure vapor of the refrigerant, and in the lower portion - low pressure vapor of the refrigerant, said low pressure corresponding to the saturation temperature of the water, that is close to the temperature of the solution at the outlet of the main absorber 9. The secondary evaporator 21 is divided in accordance with pressures due to the resistance formed as a result of the passage of the water through a screw passage formed by a spring 26, a rod (stopper) 27 inserted into the latter and made from a sponge material and the pipe 15 (FIG. 4).

The divider 20 is held in the pipe 15 due to a certain manner in which the spring 26 is fitted in the course of assembly.

Water vapor coming from the upper and lower portions of the secondary evaporator 21 gets into a secondary absorber 28 in which they are absorbed at temperatures that exceed considerably the temperature of the ambient medium. The absorber 28 is a vertical case-and-pipe apparatus with which the main evaporator 1 and the main absorber 9 have the common cowling 10. In this apparatus the water vapor coming from the secondary evaporator 21 is absorbed by the solution flowing down the inner surface of the pipes 29. The solution is distributed along the inner surface of the pipes 29 with the aid of heads 30. The heat liberated in the course of the absorption process is removed with the aid of water or air. In case water is used, it may be directed for technological or sanitary needs, and if there are no consumers, to the water coolers. The pipe bunch of the secondary absorber 28 is divided by a partition 31 into two halves.

The partition 31, cowling 10 and segment or other partitions 32 form passages for movement of water, which can provide for high speeds of water movement when it is heated over a wide range of temperature (25°–35° C).

From the upper side of the secondary evaporator 21 the water vapor is supplied into pipes washed by heated water, and from the lower side of the secondary evaporator 21 the water vapor is absorbed in the secondary absorber 28, half which is washed by the water supplied from a heat exchanger 33.

When producing artificial cold of positive temperatures, the water heated in both halves of the secondary absorber 28 is delivered farther into a heat exchanger 34 in which it is additionally heated by a strong solution from a regenerator 35.

The water coming back from the water cooler or the heat consumer is delivered into the heat exchanger 33 in which it cools down the solution supplied into the main absorber 9, where upon it passes through the secondary absorber 28 and the heat exchanger 34.

When producing cold of negative temperatures or temperatures close to 0° C (see FIG. 3), the cooling medium is supplied parallelly into the secondary absorber 28 and the heat exchanger 36.

The secondary evaporator 21 and the secondary absorber 28 have common upper and lower vapor covers 23 and 24.

The vapor spaces of the secondary absorber 28 are is divided by partitions 37, 38 and 39, 40 into sectors which preclude levelling-up of the pressure of the flow of the vapor of the refrigerant supplied from the upper and lower holes of the pipes of the secondary evaporator 21 into the pipes of the secondary absorber 28.

The strong solution is delivered into the secondary absorber 28 from the heat exchanger 34 into the sector of the vapor cover 24, confined by the partitions 39, 40 which separate the upper side of the secondary absorber 28 and, after the sprinkling of the pipes is accumulated in the lower sector of high pressure of the vapor cover 23, from which by means of a pump 41 it is delivered into the upper sector of the vapor cover 24 of the lower pressure side of the secondary absorber 28, confined by the partitions 39 and 40. From the lower sector, by a pump 42, the solution is delivered via the heat exchanger 33 into the absorber 9 or into the regenerator 35. The sectors of the lower side of the upper vapor cover 24, confined by the partitions 39 and 40, and the lower side of the upper vapor cover 23, confined by the partitions 37 and 38, are made blank. The water vapor is supplied from the evaporator 21 into the absorber 28 along the vapor space of the covers, that is not separated by the partitions 37, 38, 39, 40. The solution and water are separated in the vapor covers by the partitions 43 and 44.

From the regenerator 35 the hot solution flows undergravity due to the geometrical height of its column into the heat exchanger 34 (see FIG. 1) or the heat exchanger 36 (see FIG. 3) in which it is cooled down by the water delivered either to the consumer or into an air water cooler, whereas the solution delivered from the secondary absorber 28 into the main absorber 9 is cooled by water in the heat exchanger 33.

From the viewpoint of their design and liquid distribution the heat exchangers 33, 34 and 36 are similar to the secondary absorber 28. The hot solution sprinkles the inner surface of pipes 45, 46 secured in pipe sheets 47, 48. The cooling water moves along passages confined by cowlings 49, 50 and partitions 51, 52.

In order to preclude levelling-up of the pressure in the pipes (the difference in the pressure of saturation of the solution at the ends of the pipes constitutes 35–50 mm of Hg), the pipes accommodate the dividers 20 that are analogous to those shown in FIG. 4. The solution is supplied into and removed from the heat exchangers through covers 53, 54.

The secondary absorber 28 is separated from the main absorber 9 by a blank partition 55.

The afore-described design of the installation makes it possible to use the secondary absorber 28 with sprinkling of the inner surface of the pipes by the solution, removal of the absorption heat with the aid of water sprinkling the outer surface of the pipes, to employ a combined cooling with water by using natural and forced movement of the latter to dispose the absorber above the secondary evaporator 21 in order to deliver vapor upwardly from the secondary evaporator 21 directly into the pipes of the secondary absorber 28, to make the apparatus with the heat-transferring surfaces of a non-round section, as well as to employ a solution-solution heat exchanger to effect heat exchange between the cold solution after the main absorber 9 and the hot solution from the secondary absorber 28, to increase the number of pressure stages in the evaporators 1 and 21 and to displace heat flows within a working cycle without changing its total heat balance.

When using the afore-described installation without employing an intermediate heat carrier and employing direct air cooling, the heat exchangers 33, 34 and 36, as well as the secondary absorber 28 are provided with cowlings made from pipes having corrugated outer surfaces 90 and secured in pipe sheets. The solution flowing down the inner surface of the pipes 45, 46, 15, respectively, is cooled down by atmospheric air washing the corrugated pipes.

As it has already been stated afore, the absorbent is regenerated in the regenerator 35.

It is supplied with the solution from the main absorber 9 by means of a pump 56.

The condensate of the refrigerant, separated from the absorbent in the regenerator 35 is delivered into the secondary evaporator 21 via a hydraulic lock 57.

The main evaporator 1 is fed from a pan of the secondary evaporator 21, formed by the cover 23, via a hydraulic lock 58.

The installation functions as follows.

The circulating water is supplied into the pipes of the main evaporator 1 through a lower water cover 59 (see FIG. 1). While rising to the upper cover along the pipes 2, it is cooled down by the recirculated water that sprinkles the pipes from outside. The heat removed from the circulating water is spent on evaporation of the recirculated water. The evaporation takes place in deep vacuum, with the pressure being decreased by steps. In the installation employing an open-type evaporator (see FIG. 3) there takes place directly partial evaporation of the circulating water. The water vapor thus formed is absorbed by the solution of LiBr in the main absorber 9. Depending on the upward or downward movement of the cooling medium, provided along the height of the interpipe space of the main evaporator 1 and the main absorber 9 are different pressures that are maintained by hydraulic locks disposed in the false pipe sheets 7 and 19. As, with all the other conditions being the same, the temperature of the solution in the low-pressure absorber at the end of the absorption process equals the temperature of the solution without pressure separation in it of a portion in which a higher pressure is maintained corresponding to the saturation temperature of the water cooled in the main evaporator 1 portion coupled therewith, results in an increase in the saturation temperature of the solution of the absorbent and, consequently, in an increase in the saturation temperature of the water vapor evaporated in the secondary evaporator 21. All this leads to a higher temperature level of the heat removed from the high-pressure absorber.

The heat produced as a result of absorption of the water vapor coming from the main evaporator 1 in the main absorber 9 is removed by way of evaporating in a vacuum the water in the secondary evaporator 21.

The vertical pipes of the secondary evaporator 21 are sprinkled with water from inside. The water vapor thus produced is delivered into the vapor covers 23 and 24 and along the latter into the high- and low-pressure portions of the high-pressure secondary absorber 28, in which it is absorbed by the solution of LiBr, the liberated heat being removed from the installation with the aid of an intermediate heat carrier or directly into air.

The solution of LiBr that has become weaker as a result of absorption of the vapor of the refrigerant, is directed into the regenerator to be strengthened.

From the regenerator the strong solution flows under gravity into the heat exchanger 34 to be cooled, and, then, into the high-pressure stage of the secondary absorber 28; thereupon by means of the pump 41, the solution is fed into the low-pressure stage of the secondary absorber 28. From the secondary absorber 20 the weakened solution is delivered by the pump 42 into the heat exchanger 33 to be cooled, and from there is delivered into the main absorber 9 from which by the pump 56 it is delivered to be regenerated.

As it has been already stated above, the condensate is supplied from the regenerator into the evaporators 1 and 21 to close the circulation of the refrigerant through the loop hydraulic locks 57 and 58.

The heat supplied to the installation in the regenerator and the main evaporator 1 is removed in the heat exchangers 33, 34 and the main absorber 9 (see FIG. 1).

FIG. 3 shows another diagram of the circulation of the absorbent solution. In it, with the direction of the heat flow removed from the main evaporator 1 being the same, the solution of LiBr strengthened in the regenerator 35, is delivered into the secondary absorber 28 and, then, into the main absorber 9 only, which, in the case of rather high temperatures, makes it possible to remove heat from the heat exchanger 36 and the secondary absorber 28 when producing cold of negative temperatures or temperatures close to 0° C.

It is clear that in this case in the installations according to FIGS. 1 and 3 non-freezing weak solutions of salts (LiBr) or alkali (LiOH, KOH) are used as circulating and recirculated water.

Non-condensing gases are removed from the stages of the main absorber 9 through the throttle pipes 69 provided in the false pipe sheets in the direction of the low-pressure stage of the high-pressure secondary absorber 28, and from its high-pressure stage — into the atmosphere.

What we claim is:

1. An absorption refrigerating apparatus, comprising: a main evaporator of refrigerant, communicating by a vapor space with a main absorber; a secondary evaporator of the refrigerant, coupled into a single unit with said main evaporator and said main absorber so that said secondary evaporator and said main absorber are separated therebetween by heat transfer means; said secondary evaporator is coupled by liquid refrigerant with said main evaporator; a secondary absorber communicating by a vapor space with said secondary evaporator; a regenerator of liquid absorbent coupled at an absorbent inlet with said main absorber and at an outlet of the above absorbent with said secondary absorber, as well as coupled with said secondary evaporator by liquid refrigerant; said main absorber and the secondary evaporator comprise a group of vertical passages having, at the top, outlet means for said liquid absorbent flowing down a first surface confining the vapor space of said main absorber, and said liquid refrigerant flowing down a second surface, confining the vapor space of the secondary evaporator.

2. The installation as claimed in claim 1, wherein the vertical passages are divided in height by hydraulic locks at a level both inside each passage and in the space there-between.

3. The installation as claimed in claim 2, wherein evaporator-absorber units comprises a group of vertical pipes secured at the top and at the bottom between pipe sheets, the outlets being made in a horizontal partition disposed under the upper sheet and providing for the passage of pipes therethrough with a clearance.

4. The installation as claimed in claim 3, wherein the hydraulic locks in the inner pipe space are formed by a partition having holes for said pipes, each hole having spiral springs inserted therein and embracing said pipes, and the hydraulic locks disposed inside the pipes comprising springs carrying a stopper made from a sponge material.

5. The installation as claimed in claim 1, wherein provided between the regenerator and the secondary absorber and between the main and secondary absorbers are coolers of the absorbent.

* * * * *